United States Patent
Ishibashi

(10) Patent No.: US 6,681,277 B1
(45) Date of Patent: Jan. 20, 2004

(54) DATA PROCESSING APPARATUS AND DATA TRANSFER CONTROL METHOD

(75) Inventor: Yasuhiro Ishibashi, Ome (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 419 days.

(21) Appl. No.: 09/644,204

(22) Filed: Aug. 23, 2000

(30) Foreign Application Priority Data

Aug. 25, 1999 (JP) ............................................ 11-238774

(51) Int. Cl.[7] ........................... G06F 13/00; G06F 3/00; G06F 13/14
(52) U.S. Cl. ...................... 710/100; 710/305; 710/12; 710/20; 710/35
(58) Field of Search ............................... 710/100, 305, 710/12, 20, 35

(56) References Cited

U.S. PATENT DOCUMENTS

| | | | | | |
|---|---|---|---|---|---|
| 5,124,980 A | * | 6/1992 | Maki | .............................. | 455/5 |
| 5,615,246 A | * | 3/1997 | Beveridge | ..................... | 379/56 |
| 5,673,264 A | * | 9/1997 | Hamaguchi | .................. | 370/397 |
| 5,898,842 A | * | 4/1999 | Hakimi | ....................... | 709/249 |
| 5,917,502 A | | 6/1999 | Kirkland et al. | | |
| 6,011,751 A | * | 1/2000 | Hirabayashi | ................. | 365/236 |
| 6,212,200 B1 | * | 4/2001 | Iizuka et al. | ................. | 370/468 |
| 6,445,632 B2 | * | 9/2002 | Sakamoto | .................... | 365/205 |
| 6,452,935 B1 | * | 9/2002 | Gibbs | .......................... | 370/439 |
| 6,510,152 B1 | * | 1/2003 | Gerszberg et al. | .......... | 370/352 |

* cited by examiner

Primary Examiner—T. M Vo
(74) Attorney, Agent, or Firm—Finnegan, Henderson, Farabow, Garrett & Dunner, L.L.P.

(57) ABSTRACT

Two transfer modes of a band-guaranteed cycle and an event-driven asynchronous cycle are defined in a multimedia bus. In the band-guaranteed cycle, stream data is transferred between nodes in real time using a reserved band for each cycle time. Both a single-edge access and a double-edge access are provided for the stream data transfer in the band-guaranteed cycle, and it is possible to select one of the single-edge access and double-edge access for each data transfer between nodes. The transfer band of stream data on the bus can thus be expanded and the transfer efficiency of AV stream can be improved.

5 Claims, 11 Drawing Sheets

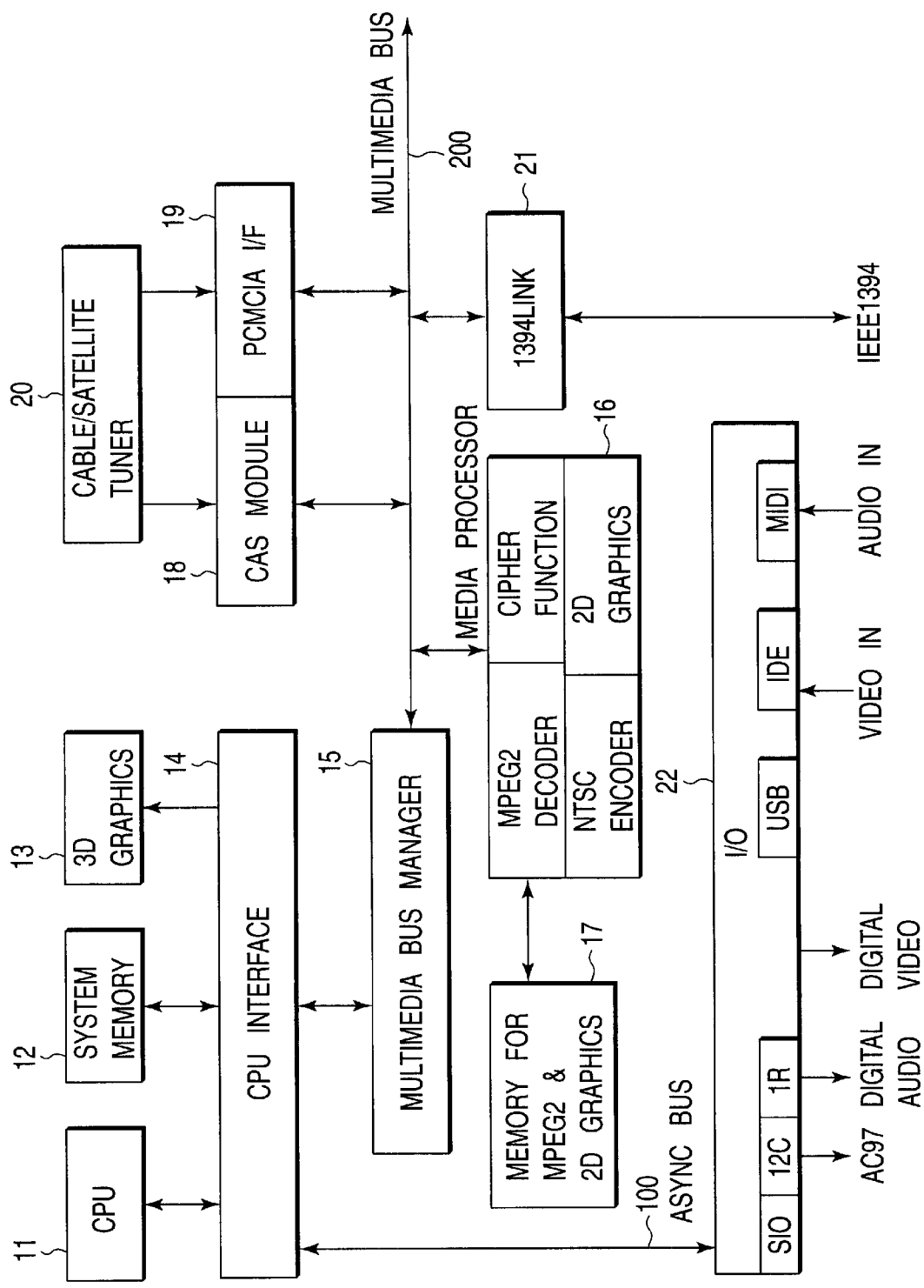
F I G. 1

CHANNEL CONTROL REGISTER

| Config Add. | Ch Cnt.(8bit) | Ch No.(8bit) | Necessity (16bit) |
|---|---|---|---|
| 10 | | 2 | 123 |
| 14 | | 3 | 456 |
| 18 | | 4 | 789 |

| 7 | 6 | 5 | 4 | 3 | 2 | 1 | 0 |
|---|---|---|---|---|---|---|---|
| Ch Ava | In/Out | Reject | DE Ca | DE En | | | |

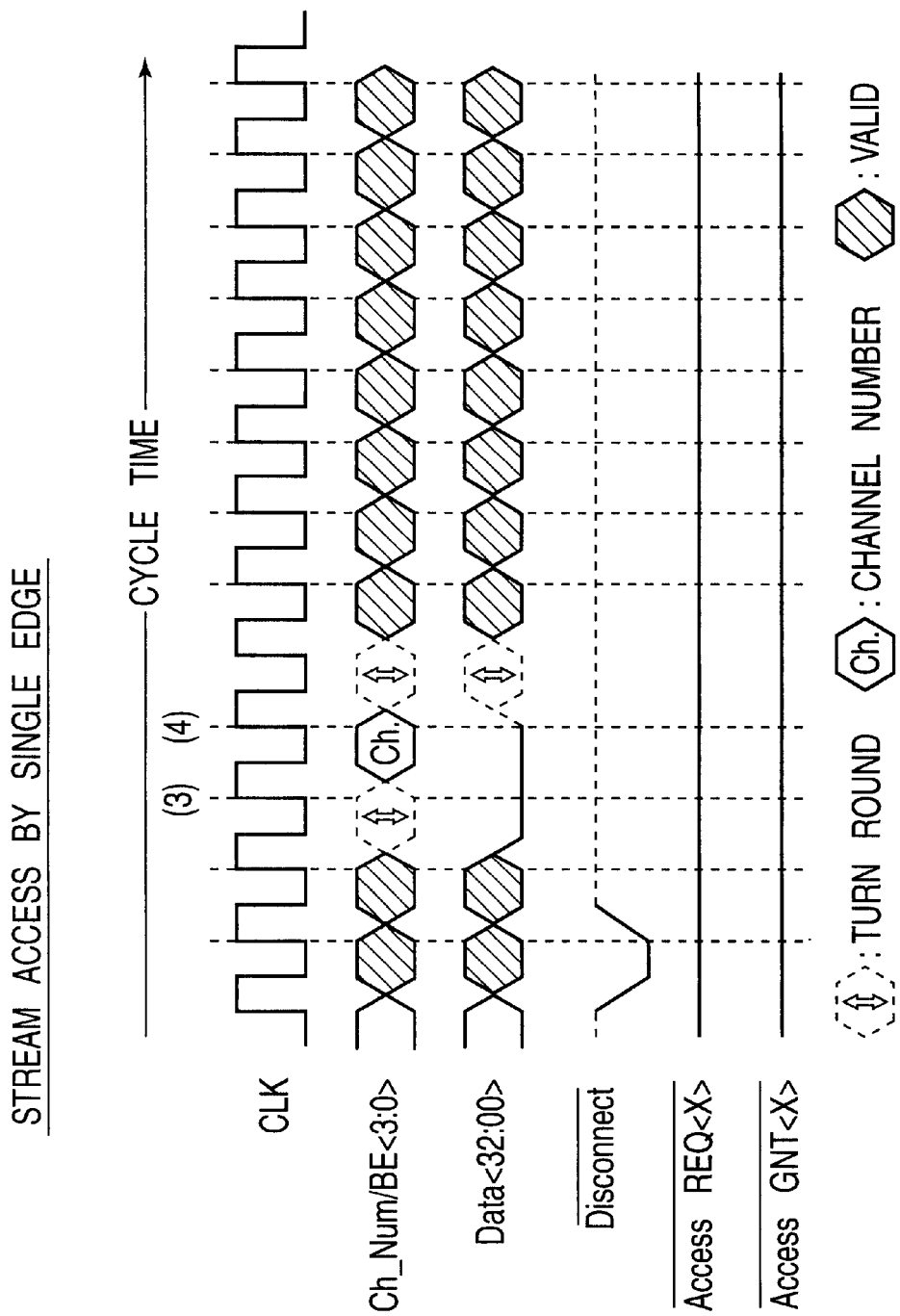
F I G. 6

DATA PROCESSING APPARATUS AND DATA TRANSFER CONTROL METHOD

CROSS-REFERENCE TO RELATED APPLICATIONS

This application is based upon and claims the benefit of priority from the prior Japanese Patent Application No. 11-238774, Aug. 25, 1999, the entire contents of which are incorporated herein by reference.

BACKGROUND OF THE INVENTION

The present invention relates to a data processing apparatus and a data transfer control method and, more particularly, to a data processing apparatus for processing various kinds of data, such as audio/video data, other data and programs, and a data transfer control method applied to the data processing apparatus.

Recently, as the computer technology is advancing, various types of digital information device, such as multimedia-handling personal computers, set-top boxes, digital TVs and game machines, have been developed. There has been a demand for a capability to handle various kinds of media, such as broadcasting media, communication media and storage media, in digital information devices of this type.

Accordingly, people are demanding that personal computers should be provided with a function of processing AV (Audio/Video) stream data that needs real-time processing in addition to functions of processing ordinary programs. For consumer AV machines, such as set-top boxes, digital TVs and game machines, there has been a demand for a function of processing computer data, i.e., data other than A/V stream data, and programs, in order to adapt the machines to software-controlled interactive title playback or the like.

Because the bus architecture of conventional computers handle an AV stream and computer data as the same type, however, they are inadequate to feed AV streams that demand highly real-time processing. When a traffic of computer data becomes suddenly heavy while AV stream data and computer data are flowing on the bus at the same time (e.g., at the time of printing or accessing to a file), the AV stream data brings about a significant transfer delay. The reason is as follows. AV stream data and computer data are not distinguished from each other when they are transferred on the bus and thus it is not possible to perform a process of causing AV stream data, which needs real-time processing, flow first by priority.

Even though priority is given only to the transfer of AV stream data, a band sufficient for real-time transfer of AV stream data cannot be necessarily secured when a plurality of items of AV stream data flow on the bus simultaneously, such as when digital broadcast data is stored and displayed simultaneously while it is being received. If, furthermore, an event which needs fast processing occurs at the time of an insufficient band, a process for that event to be executed using programs will be delayed greatly.

Conventional AV machines physically accomplish peer-to-peer connection of devices that handle AV streams by connecting a plurality of devices in the processing order of the AV streams. Therefore, AV streams are not basically input to a CPU. The recent appearance of media (hyper media), which has AV streams and interactive commands integrated, demands that a CPU should process streams. This makes the present physical peer-to-peer connection of devices difficult, and studies on bus connection have started.

BRIEF SUMMARY OF THE INVENTION

An object of the present invention is to provide a data processing apparatus and a data transfer control method which are capable of efficiently transferring data on a bus.

Another object of the present invention is to provide a data processing apparatus and a data transfer control method which are suitable for integration of AV streams and computer data.

In order to resolve the above objects, a data processing apparatus according to a first aspect of the present invention, comprises a bus used for data transfer; a plurality of nodes connected to the bus and capable of sending/receiving data; and mode selection means having a first bus access mode for transferring data in synchronization with one of rising and falling edges of a clock and a second bus access mode for transferring data in synchronization with each of the rising and falling edges of the clock, for selecting one of the first and second bus access modes for each data transfer.

In the data processing apparatus, the first bus access mode of a single-edge type and the second bus access mode of a double-edge type can selectively be used in a data transfer cycle executed on the same bus. Since, in the double-edge type bus access mode, data is transferred at two times the speed in the single-edge type bus access mode, the transfer bandwidth of data can be expanded. Particularly in the band-guaranteed cycle for transferring data in real time by assigning a reserved band for each cycle time, even though the time periods required for data transfer are the same, the bandwidth of stream data can be expanded substantially two times using the second bus access mode of the double-edge type. It is thus possible to efficiently transfer stream data such as audio/video data in real time.

Since, furthermore, a bus access mode can be selected for each data transfer, data transfer between nodes can be performed in the second bus access mode of the double-edge type and data transfer between other nodes can be done in the first bus access mode of the single-edge type. If the performance of the sender node and that of the receiver node both correspond to the second bus access mode of the double-edge type, data can be transferred at high speed between the sender and receiver nodes in the second bus access mode of the double-edge type. Whether each of the nodes corresponds to the second bus access mode can be determined on the basis of performance information previously stored in the nodes.

If, as described above, the single edge and double edge can be switched by the performance of each of the sender and receiver nodes, the performance of the nodes can be delivered sufficiently. Since, moreover, a circuit for the double-edge transfer has only to be incorporated into a node only for processing necessary stream data of a wide band, an internal circuit can be simplified in a node for processing relatively-low band data, thus decreasing in costs.

A data processing apparatus according to a second aspect of the present invention, comprises a bus for which a band-guaranteed cycle capable of transferring stream data in real time by assigning a predetermined reserved band for each cycle time and an asynchronous transfer cycle for asynchronously performing a transfer cycle during a period other than the reserved band by a bus access request of a bus master are each defined as a data transfer cycle; a plurality of nodes connected to the bus and capable of performing the data transfer cycle using one of the band-guaranteed cycle and the asynchronous transfer cycle; means for assigning one of plurality of channel numbers to a sender node and a receiver node of each stream data such that the stream data is transferred, using the band-guaranteed cycle in a peer-to-peer mode, between nodes to which a same channel number is assigned; and mode selection means having a first bus access mode for transferring the stream data in synchronization with one of rising and falling edges of a clock and a second bus access mode for transferring the stream data in synchronization with each of the rising and falling edges of the clock, for selecting one of the first and second bus access modes for each channel number to transfer the stream data using the band-guaranteed cycle.

The above data processing apparatus has both the band-guaranteed cycle and asynchronous transfer cycle. If the band-guaranteed cycle is used for transfer of stream data and the asynchronous transfer cycle is used for transfer of other data, both the AV stream and computer data can be transferred sufficiently on the same bus. It is thus possible to achieve both the band guarantee of AV stream and a high-speed response to an event caused asynchronously. In the band-guaranteed cycle, the same channel number is assigned to the sender and receiver nodes and thus a logical peer-to-peer connection mode can be achieved on the bus. Since the stream data can be transferred in the peer-to-peer mode on the bus, it can be transferred efficiently on the bus without any physical peer-to-peer connection between nodes. Furthermore, the bandwidth of stream data transfer can easily be expanded using a transfer mode of the double-edge type when the need arises.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram illustrating the configuration of a system of a data processing apparatus according to one embodiment of the present invention;

FIG. 6 is a timing chart specifically showing timing at which stream access is performed by the single edge access in the embodiment;

DETAILED DESCRIPTION OF THE INVENTION

Figure 2:
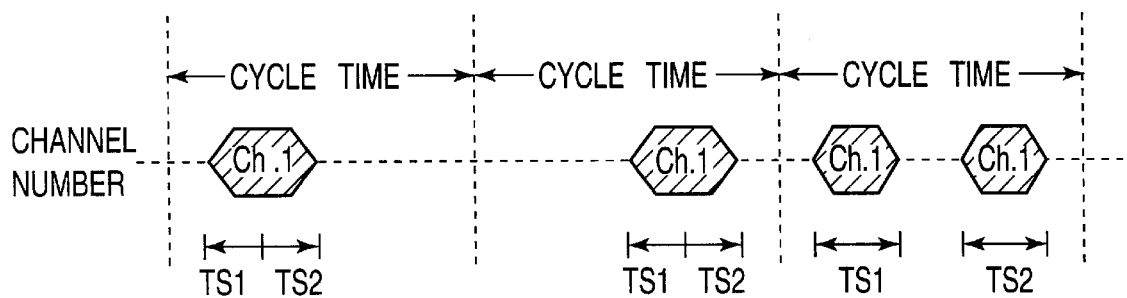
FIG. 2 is a diagram for explaining cycle time used in the system according to the embodiment.

An embodiment of the present invention will now be described with reference to the accompanying drawings.

FIG. 1 illustrates the system configuration of a data processing apparatus according to one embodiment of the present invention. This data processing apparatus is a multimedia-handling computer capable of handling various kinds of media, such as broadcasting media, communication media and storage media. To achieve both a program executing function and a function of dealing with AV (Audio/Video) stream data on a high order, the data processing apparatus has a multimedia bus 200 in addition to an ordinary internal bus (Async Bus) 100 which executes event-driven type asynchronous transfer. The multimedia bus 200 is an internal bus for which two transfer modes of a band-guaranteed cycle capable of transferring AV stream data in real time and an event-driven type asynchronous transfer cycle, are defined. The use of the multimedia bus 200 can permit both computer data and AV stream data to be transferred with efficiency. The band-guaranteed cycle basically means a transfer mode in which stream data is transferred in a real-time-guaranteed state by assigning a predetermined time period to be used for data transfer for each cycle time as a reserved band. In other words, the band-guaranteed cycle corresponds to a so-called isochronous cycle.

In the band-guaranteed cycle, the transfer bandwidth of stream data can be varied according to the time period assigned as a reserved band for each cycle time. Even though the time periods are the same, the transfer bandwidth can be expanded using a double-edge access.

System Structure

The system Structure will now be specifically discussed below.

As illustrated, the system of the data processing apparatus comprises a CPU 11, a system memory 12, a 3D graphics accelerator 13 and a CPU interface 14. The CPU 11, system memory 12 and 3D graphics accelerator 13 are mutually connected by the CPU interface 14, and execute a program executing routine, a 3D graphics computation routine and so forth. The CPU interface 14 is a host bus bridge which bidirectionally connects the CPU bus and the internal bus 100. An I/O controller 22C is connected to the internal bus 100, and has various interfaces including an interface for outputting digital video signals to an external AV machine or the like and other interfaces for communication with various kinds of peripheral devices (an SIO interface, an I$^2$C bus interface, an IR (Infrared) interface, a USB interface, an IDE interface and an MIDI interface). Storage devices such as a DVD drive and an HDD are connected to the I/O controller 22 via the IDE interface.

As illustrated, a multimedia bus manager 15, a media processor 16, a CAS module 18, a PCMCIA interface 19, and an IEEE1394 interface 21 are connected to the multimedia bus 200. Those multimedia bus manager 15, media processor 16, CAS module 18, PCMCIA interface 19 and IEEE1394 interface 21 are nodes (devices) each of which performs data transfer via the multimedia bus 200 and can use the aforementioned band-guaranteed cycle and asynchronous transfer cycle.

The multimedia bus manager 15 is the manager node for the multimedia bus 200, and performs control to execute the band-guaranteed cycle and asynchronous transfer cycle on the multimedia bus 200. Specifically, the multimedia bus manager 15 manages a reserved band, which is used in the band-guaranteed cycle, and a cycle time and performs bus control. The multimedia bus manager 15 also has a function of bidirectionally connecting the multimedia bus 200 and the CPU interface 14, so that it can send an AV stream, which is transferred from another node on the multimedia bus 200, to the CPU 11 and send an AV stream, which is fetched into the system memory 12 from a DVD drive, to another node on the multimedia bus 200.

The media processor 16 has capabilities such as MPEG-2 decoding, stream ciphering, NTSC encoding and 2D graphics computation. It is the media processor 16 which executes control to reproduce and display an AV stream. The CAS module 18 is an exclusive interface for connection of a CATV/satellite tuner 20. The CATV/satellite tuner 20 can be connected via the PCMCIA interface 19.

The fundamental usage of the multimedia bus 200 will now be explained.

First, a description will be given of a case where video data received by the CATV/satellite tuner 20 is sent to a storage device and an external IEEE1394 device while being displayed on a monitor.

The video data consists of MPEG-2 transport streams (MPEG-2_TS) which are sent to the media processor 16 from the CAS module.18 or the PCMCIA interface 19. In this case, the same channel number (e.g., channel number 1) is assigned to the CAS module 18 or the PCMCIA interface 19 which serves as a sender node and the media processor 16 which serves as a receiver node. Then, the sender node sends an MPEG-2 transport stream to the receiver node in peer-to-peer mode in the aforementioned band-guaranteed cycle. The media processor 16 performs, in parallel, a process of decoding the MPEG-2 transport stream and reproducing and displaying the decoded stream and a ciphying to protect the MPEG-2 transport stream from an unauthorized copy. The ciphyed stream data is sent from the media processor 16 to the multimedia bus manager 15 and the IEEE1394 interface 21 in order. In this case, the same channel number (e.g., channel number 2) is assigned to the media processor 16 which is a sender node and the multimedia bus manager 15 and the IEEE1394 interface 21 which are receiver nodes. As a result, data transfer from the media processor 16 to the multimedia bus manager 15 is carried out in peer-to-peer mode and so is data transfer from the media processor 16 to the IEEE1394 interface 21. This stream transfer with the channel number 2 is performed in parallel to the stream transfer with the channel number 1 in a time-divisional manner.

The ciphyed stream is temporarily loaded in the system memory 12 via the multimedia bus manager 15 and the CPU interface 14, and then recorded on a storage device via the I/O controller 22. At the same time, the encoded stream is transferred to an external IEEE1394 device from the IEEE1394 interface 21.

Multimedia Bus

A specific transfer control scheme for the multimedia bus 200 will now be discussed.

1) Cycle Time

As shown in FIG. 2, access to the multimedia bus 200 is carried out by dividing the time by given time units. This given interval is called "cycle time".

2) Transfer Mode

To realize the aforementioned two transfer modes (the band-guaranteed cycle and asynchronous transfer cycle), the multimedia bus 200 has two kind of bands. One is a reserved band and the other is an asynchronous band (hereinafter referred to as "Async band"). The reserved band is a band reserved during the cycle time in order to guarantee the real time transfer. A transfer cycle using this reserved band is the foregoing band-guaranteed cycle (hereinafter referred to as "reserved band cycle"), and a transfer cycle using the Async band is the aforementioned asynchronous transfer cycle (hereinafter referred to as "Async cycle").

It is to be noted that the reserved band is not clearly distinguished from the Async band by time, but a band, which is processing a reserved band, corresponds to the reserved band and a transfer cycle, which is executed as needed in accordance with an access request in a period other than the reserved band, corresponds to the Async band.

3) Channels

All the access to the multimedia bus 200 is managed by channels, so that transfer over a plurality of channels can be performed time-divisionally. FIG. 2 shows an example where time of two time slots (TS1, TS2) is reserved as the reserved band of the channel 1. The two time slots should not necessarily be consecutive along the time, but have only to be allocated within one cycle time.

4) Types of Access

There are following three types of access.

a) Stream Access

Figure 3:
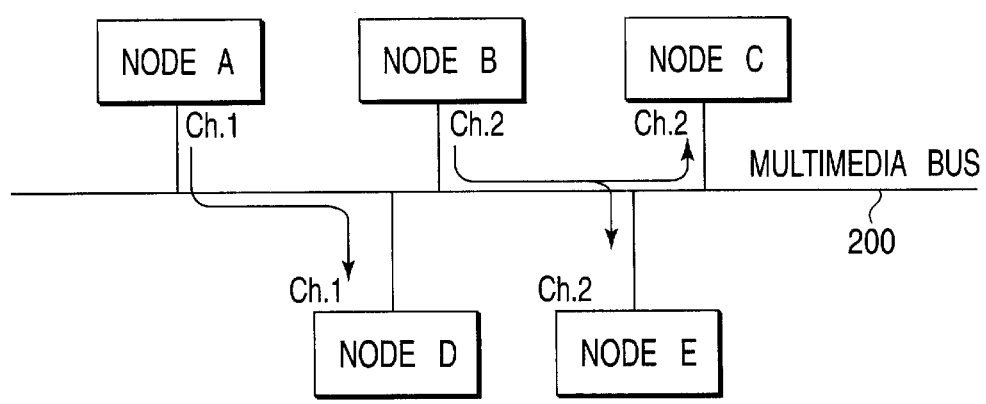
FIG. 3 is a diagram for explaining stream access used in the system according to the embodiment.

In the stream access, a sender node and a receiver node are designated for each channel and no other addresses than the channel are used. Wait control from the receiver side as in an ordinary PCI bus transaction is not carried out either. How this stream access is done is illustrated in FIG. 3. In FIG. 3, a node A is the sender node with the channel number 1 and a node D is the receiver node with the channel number 1. In this case, the nodes A and D to both of which the channel number 1 is assigned are logically connected on the multimedia bus 200 in a peer-to-peer fashion, and data transfer between the nodes A and D is directly carried out. For a single sender node, a plurality of receiver nodes with the same channel number as that of the sender node may be provided. FIG. 3 shows a case where a node B is the sender node with the channel number 2 and nodes C and E are the receiver nodes that have the channel number 2. In this case, stream data from the node B is multi-cast to the nodes C and E. According to this embodiment, the stream access is always used in the reserved band cycle, and the stream access can also be used in the Async cycle.

a-1) Option of Stream Access

The stream access is normally obtained by single-edge access in which data is transferred in synchronization with one of the rising and falling edges of a clock of the multimedia bus 200; however, it can be done by double-edge access when the need arises. The double-edge access is employed to expand the transfer bandwidth of stream access and caused to transfer data in synchronization with each of the rising and falling edges of a clock of the multimedia bus 200.

b) Single Access

This access is used only in the Async cycle and consists of an address and command transfer phase and a single data transfer phase following the former phase.

c) Burst access

This access is used only in the Async cycle and consists of an address and command transfer phase and a plurality of data transfer phases following the former phase.

Channel Control Register

Figures 4, 5:
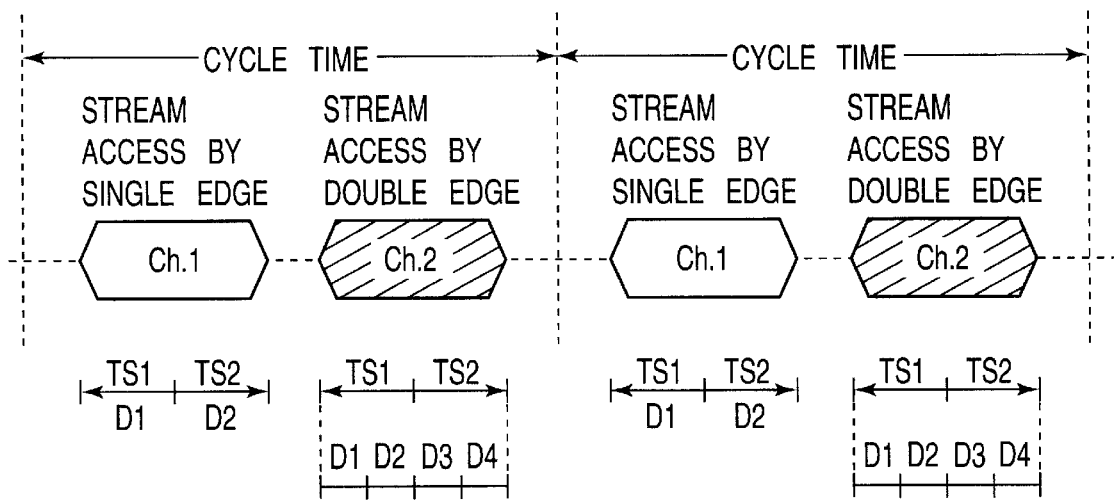
FIG. 4 is a diagram showing a channel control register used in the system according to the embodiment.
FIG. 5 is a timing chart for explaining the principle of single edge access/double edge access used in the embodiment.

FIG. 4 shows the contents of a channel control register provided in each node on the multimedia bus 200.

The channel control register is defined in the configuration space of each node and can have control information for a plurality of channels. The control information for each channel is constructed with channel control information (Ch Cnt), channel number information (Ch No.) and necessary band information (Necessity) as one set. The necessary band information indicates a band necessary for stream transfer, and is set for each stream to be transmitted and received by the driver (software) of the associated node. The channel number information indicates the channel number set by the manager node. The channel control information includes channel available information (Ch. Ava) indicating whether or not the associated channel is available, I/O bit information (In/Out) indicating whether the associated channel is an input channel (receiver node) or an output channel (sender node), reject bit information (Reject) set when no channel numbers are assigned owing to lack of frequency bands, double-edge capable bit information (DE Ca) representing whether a node has a capability of using the double-edge access, and double-edge enable bit information (DE En) set when the double-edge access is performed.

The double-edge capable bit information (DE Ca) is information which is recorded in advance when each node is manufactured, and it is set to "1" in a device capable of outputting/latching data at each of the rising and falling edges of a clock and "0" in a device capable of doing so only at the rising edge.

The double-edge enable information (DE En) is information which is set as needed by the manager node, and its default valve is "0" (single-edge access). The node at which the double-edge enable bit information (DE En) is set to "1" performs a data input/out operation using the double-edge access.

Control of Stream Access

In the foregoing embodiment of the present invention, the single-edge access and double-edge access can be used alternatively for each of the channel numbers for performing the stream access, which is shown in FIG. 5.

FIG. 5 is a timing chart showing stream access performed using a reserved band for two time slots (TS1, TS2). The single-edge access is selected for the stream access of channel number 1, while the double-edge access is selected for the stream access of channel number 2. The physical time periods (two time slots TS1, TS2) of channel numbers 1 and 2, which are assigned to the respective cycles as reserved bands, are the same; however, the stream access of channel number 2 transfers data at two times the speed of that of channel number 1, by using the double-edge access.

Stream Access by Single Edge

FIG. 6 specifically shows the timing of stream access by single-edge access.

First, signal lines included in the multimedia bus 200 will be explained. The multimedia bus 200 includes a clock signal (CLK) line, a 3-bit channel number/byte enable signal (ch_Num/BE) line, a 32-bit data (Data) line, a disconnect signal (Disconnect⁻) line, a bus request signal (Access REQ⁻) line, a bus grant signal (Access GNT⁻) line and a ready signal (Ready⁻) line. The upper line "⁻" represents an active low signal.

The channel number/byte enable signal (ch_Num/BE) indicates the channel number (ch) whose stream access is to be started at the address phase of the reserved band cyle, and indicates a valid byte lane of data on the data line at the data phase of the reserved band cycle. The channel number is output by the manager node in the reserved band cycle but is output by a bus mater node which has obtained a bus-using permission in the Async cycle.

The disconnect signal (Disconnect⁻) is a signal to disconnect nodes from the current stream access and indicates the end of the transfer cycle. To forcibly stop transmission of stream data from the sender node during stream access, the receiver node outputs this disconnect signal (Disconnect⁻). As the disconnect signal (Disconnect⁻) usually indicates the end of a stream access, the manager node outputs the disconnect signal (Disconnect⁻).

The access request signal (Access REQ⁻) and access grant signal (Access GNT⁻) are used to manage the bus-using permission for the Async cycle. The paired request signal (Access REQ⁻) and access grant signal (Access GNT⁻) are provided between the manager node that performs bus management and each node. An access request (bus-using permission request) is made using the Access REQ⁻ signal. The node which wants to access the bus asserts the Access REQ⁻. Arbitration of the access request is carried out by the manager node. This node is informed of access permission by the Access GNT⁻, which is asserted at the same time as the assertion of Disconnect⁻. The node that is requesting an access latches the Disconnect⁻ and Access GNT⁻ by the CLK and when the Disconnect⁻ is asserted, the node to which the Access GNT⁻ is asserted obtains the bus-using permission (master node).

In a stream access, each node can receive and output data in accordance with the clock CLK when its own channel number is designated by the channel number/byte enable signal (ch_Num/BE). The channel number is output from the rising edge of the third clock from the clock at which the disconnect signal (indicating the end of the access cycle) has been asserted, and is latched at the rising edge of the fourth clock. In, in the reserved band cycle, the manager node serves as the master node for stream access.

In the stream access, the sender node supplies data onto the Data line in synchronization with the rising edge of the clock CLK, while the receiver node latches data on the Data line in synchronization with the rising edge of the clock CLK. The only address used in the stream access is a channel number, and none of the addresses other than the channel number are used therein. In the stream access, no wait control by the Ready⁻ signal is not performed.

In other words, the data transfer from the sender node to the receiver node is performed in the same manner as in devices to which they are connected in a one-to-one relationship.

Stream Access by Double Edge

Figure 7:
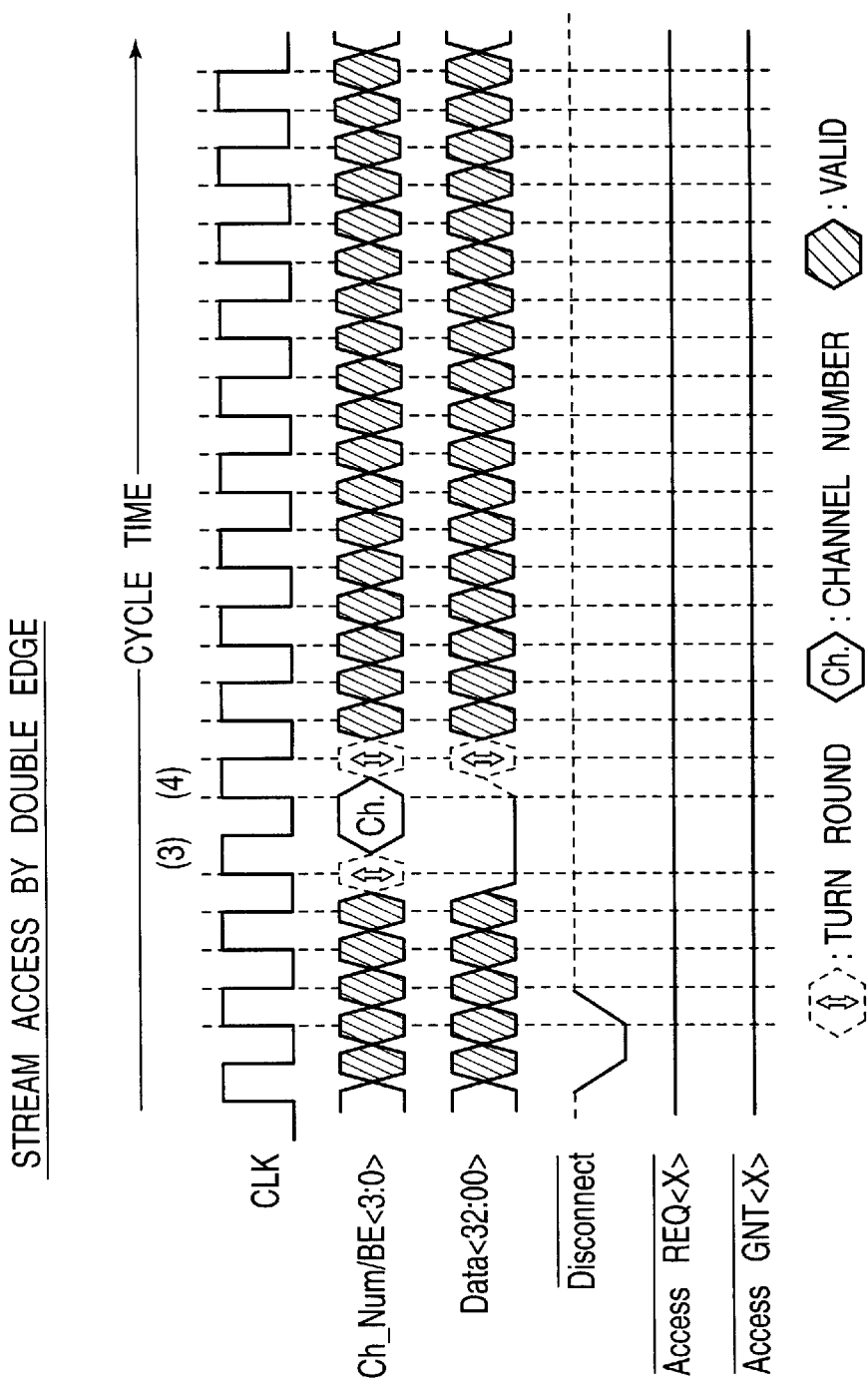
FIG. 7 is a timing chart specifically showing timing at which stream access is performed by the double edge access in the embodiment.

FIG. 7 specifically shows the timing of stream access by double-edge access.

The double-edge stream access differs from the single-edge stream access shown in FIG. 6 in that data is input and output in synchronization with each of the rising and falling edges of the clock CLK. Specifically, in the stream access, the sender node supplies data onto the Data line in synchronization with each of the rising and falling edges of the clock CLK, while the receiver node latches (receives) data on the Data line in synchronization with each of the rising and falling edges of the clock CLK. Therefore, the bandwidth of stream data can be expanded two times using the single edge stream access.

Transceiver Controller in Node

Figure 8:
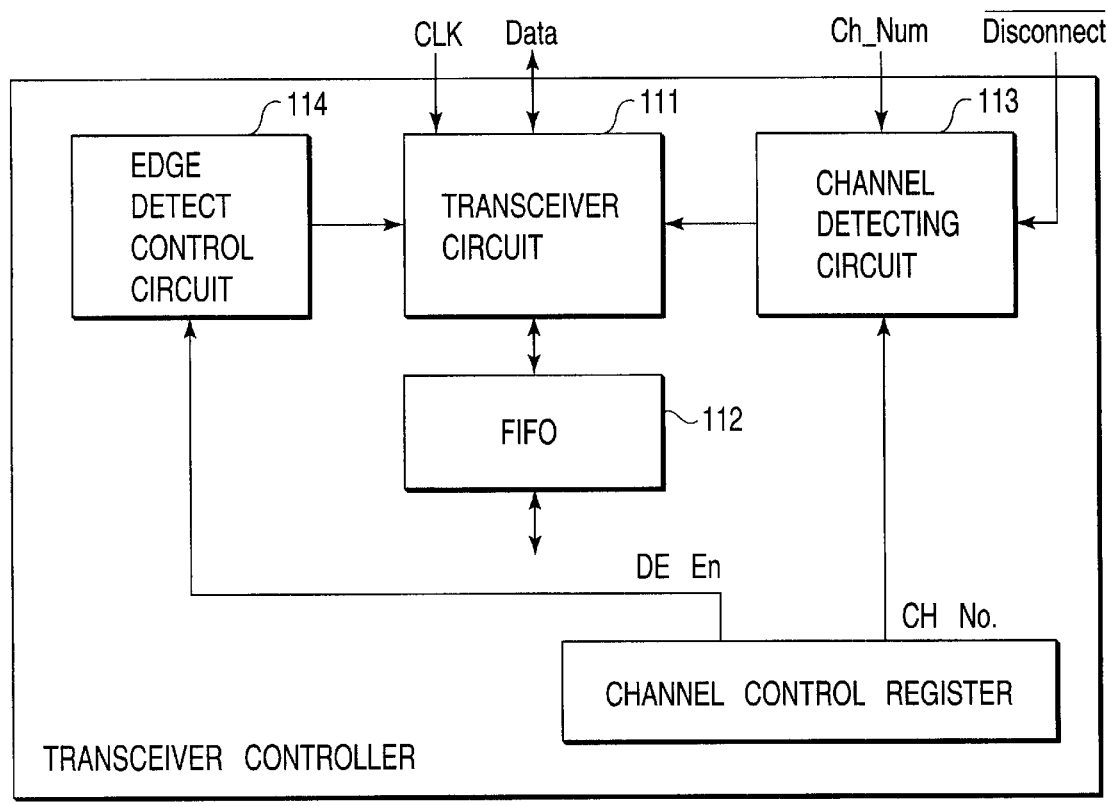
FIG. 8 is a block diagram showing an example of the structure of a transceiver controller provided for each node according to the embodiment.

FIG. 8 illustrates an example of hardware structure necessary for transferring data by selectively switching between the single-edge access and the double-edge access.

As FIG. 8 illustrates, a data transceiver controller provided in each of nodes corresponding to the double-edge access includes a transceiver circuit 111, an FIFO buffer 112, a channel detection circuit 113, and an edge detection control circuit 114. The transceiver circuit 111 inputs/outputs data in synchronization with the edges of a detected clock CLK, and has a function of detecting the falling edge of the clock CLK as well as the rising edge thereof. Whether to detect the falling edge effectively is controlled by the edge detection control circuit 114. When double-edge enable bit information (DE En) of the channel control register is "1", the circuit 114 allows the transceiver circuit 111 to fulfill the function of detecting the falling edge. Thus, data can be transferred by the double-edge access, and the output of data from the FIFO buffer 112 onto the multimedia bus 200 or the input of data from the multimedia bus 200 to the FIFO bus 112 is performed in synchronization with each of the rising and falling edges of the clock CLK.

The channel detection circuit 113 latches a channel number supplied onto the multimedia bus 200 at the rising edge of the third clock after the Disconnect signal is asserted, and compares it with a channel number thereof set in the channel control register. When these channel numbers coincide with each other, the channel detection circuit 113 controls the transceiver circuit 111 to start inputting/outputting data by the stream access.

A transceiver circuit 111 in a node which does not correspond to the double-edge access, is constituted of a logic having only the function of detecting a falling edge and does not perform the function of the edge detecting control circuit 114.

Stream Access Control Using Async Cycle

Next, the principle of stream access control using the Async cycle will be discussed with reference to FIGS. 9A and 9B.

Figure 9A:
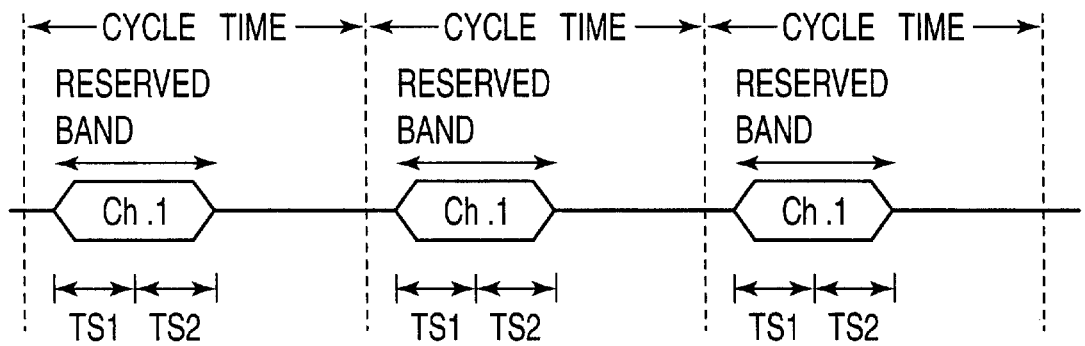
FIGS. 9A and 9B are diagrams for explaining the principle of Async stream access used in the embodiment.
Figure 9B:
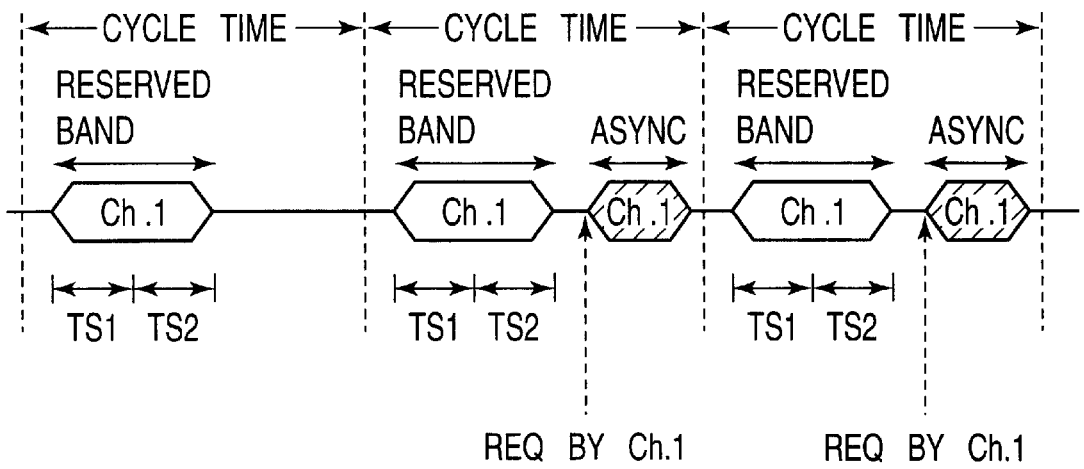

FIG. 9A presents a timing chart for the stream access carried out using a reserved band for two time slots (TS1, TS2). The stream access control using the Async cycle allows the stream access to be executed even in the Async cycle. In other words, the stream access in the Async cycle is a special form of a reserved band cycle which aims at expanding the bandwidth of the reserved band. As shown in FIG. 9B, therefore, the stream access can be performed in a period other than the reserved band (TS1, TS2). The execution of the Async cycle is granted when a bus request from the sender node is accepted. In this case, in the Async cycle, the stream access is executed by supplying the same channel number as that of the reserved band cycle to the bus from the sender node. The stream access using the Async cycle therefore allows the bandwidth of the reserved band to be expanded. Since the Async cycle is the stream access, the foregoing single-edge access and double-edge access can be used selectively.

Figure 10:
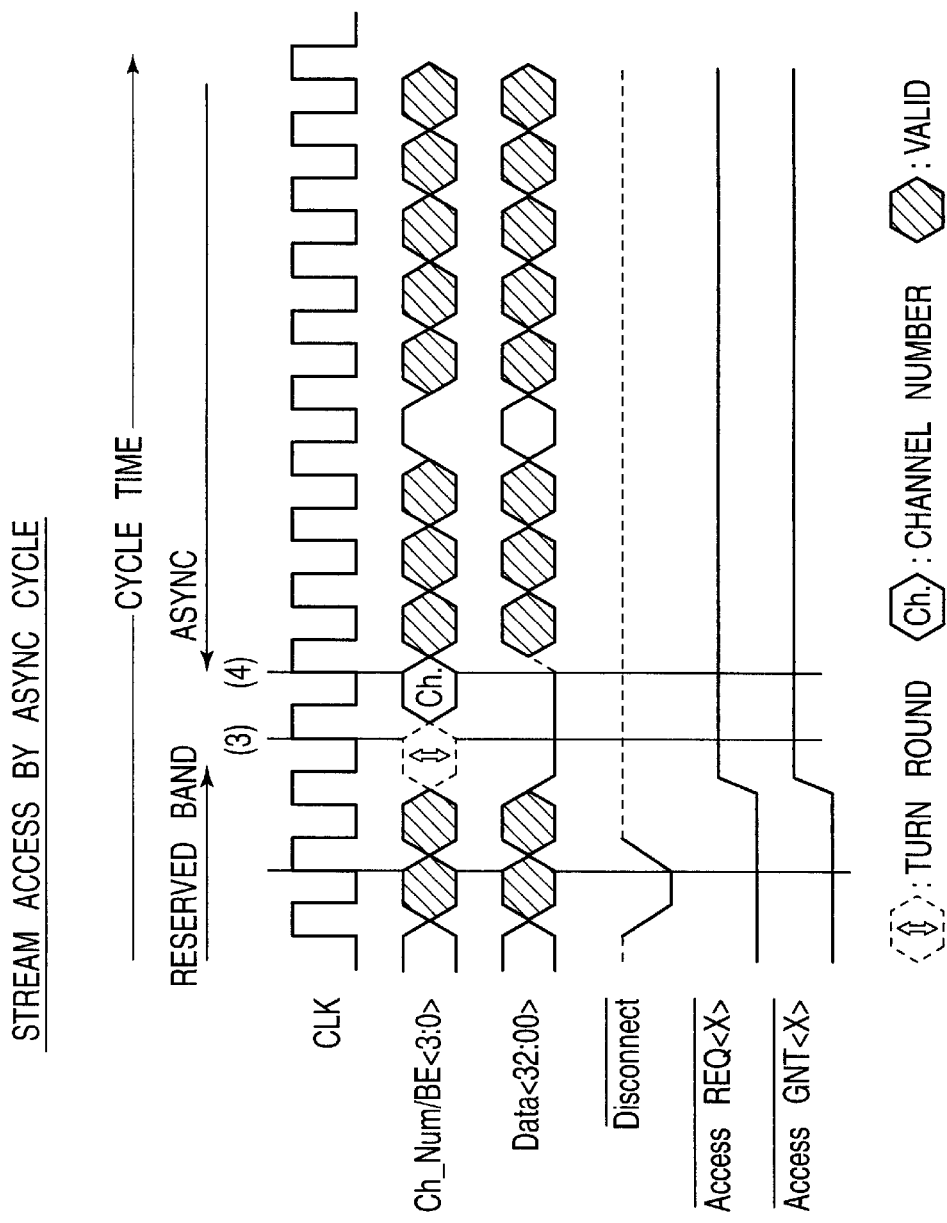
FIG. 10 is a timing chart showing specific timing for controlling the Async stream access shown in FIG. 9.

FIG. 10 specifically shows the timing for stream access using the Async cycle (in the case of single-edge access).

When the amount of data stored in the transmission buffer of the sender node that is executing the reserved band cycle exceeds a predetermined value, the sender node generates the bus request (Access REQ⁻) for the Async cycle. When granted by the manager node, the sender node performs stream access in the Async cycle by designating the same channel number as that of the current reserved band cycle at the rising edge of the third clock from the clock at which the disconnect signal (indicating the end of the access cycle) has been asserted. Accordingly, the stream access can be executed in a period other than the reserved band, thereby expanding the bandwidth of the reserved band under execution.

If a reserved band cycle is executed by the single-edge access, the Async cycle for expanding the band of the reserved band cycle is done by the same single-edge access. If a reserved band cycle is executed by the double-edge access, the Async cycle for expanding the band of the reserved band cycle is done by the same double-edge access. In other words, the stream access allows both the reserved band cycle and Async cycle to be increased in band by the double-edge access.

Figure 11:
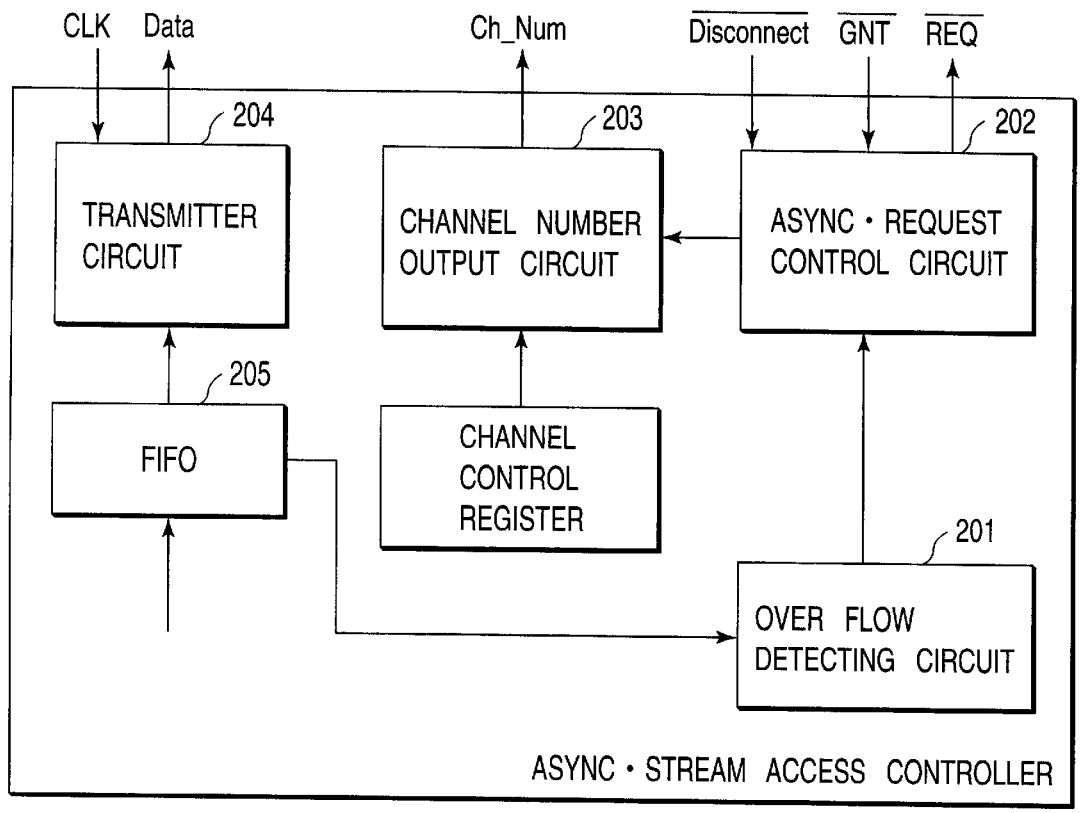
FIG. 11 is a block diagram showing an example of the structure of hardware for gaining the Async stream access shown in FIG. 9.

FIG. 11 exemplifies a hardware structure of each which node accomplishes the stream access control using the Async cycle.

At the time of transmission, externally input stream data is supplied to an FIFO buffer 205. The stream data is read out from the FIFO buffer 205 and sent on the multimedia bus 200 via the transmission circuit 204. When the amount of data stored in the FIFO buffer 205 has exceeded the predetermined value, an overflow detection circuit 201 controls an Async request control circuit 202 to generate the Access REQ⁻ signal. When acquiring a bus-using permission through the grant signal GNT⁻ from the manager node, the Async. request control circuit 202 controls a channel-number output circuit 203 to output the same channel number (ch_Num) as that of the current reserved band cycle at the rising edge of the third clock from the termination of the current access cycle that has been made by the disconnect signal Disconnect⁻.

The stream access using the Async cycle is applied to the following case.

When the traffic of a stream to be processed by the sender node that is sending stream data in the reserved band cycle is changed, changing the necessary band (e.g., when a stream to be transmitted is changed from SD data of standard video images to HD data of high-definition video images by changing a program through the tuner), the assigned bands of the sender node and receiver node are changed. In this case, the driver of the associated node or the node itself rewrites the Necessity information, but it is practically difficult to dynamically change the reserved bandwidth at the transition of the cycle time.

When a stream to be transmitted is changed to HD data from SD data, therefore, the stream access is carried out temporarily using both the reserved band cycle and the Async cycle until the reserved bandwidth is increased. After the reserved bandwidth is expanded, a stream access is performed using the reserved band cycle alone. Even if the necessary band abruptly changes, therefore, it is possible to prevent overflowing of the buffer of the sender node or the like.

Needless to say, the reserved bandwidth can be expanded even by changing the single-edge access to the double-edge access.

Single-Edge/Double-Edge Selecting Operation

Figure 12:
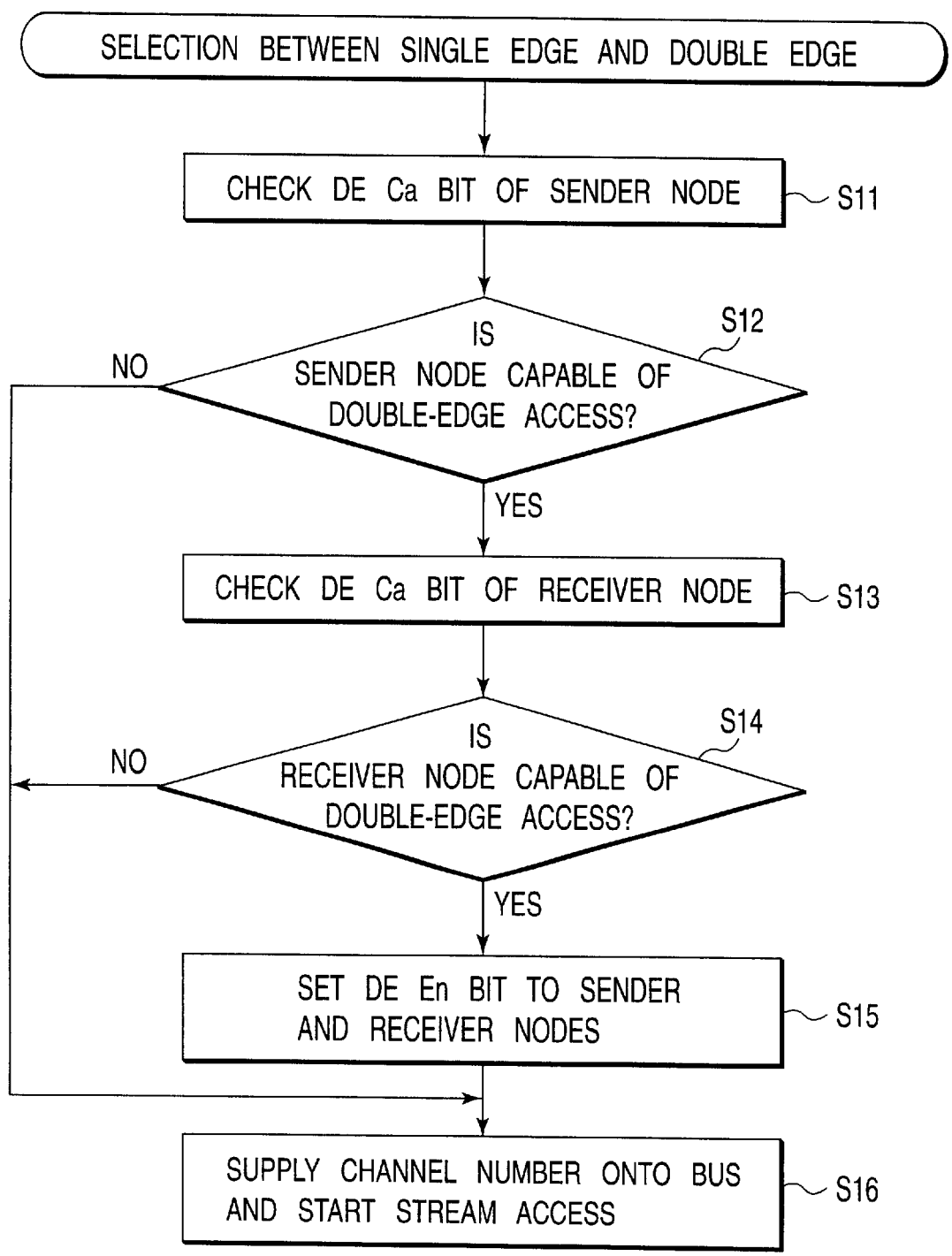
FIG. 12 is a flowchart for explaining an example of the procedure of a single-edge/double-edge select operation used in the embodiment.

A process of performing a single-edge/double-edge selecting operation by the multimedia bus manager 15 as a management node or a software driver (management node driver) for controlling the multimedia bus manager 15, will now be described with reference to the flowchart of FIG. 12.

To transfer AV stream data by the stream access between nodes, first, the management node or management node driver checks double-edge capable bit information (DE Ca) at the sender node and then determines whether the sender node is a device capable of double-edge access (steps S11 and S12).

If the double-edge capable bit information (DE Ca) at the sender node is "0" or the sender node is a device which is not adapted to the double-edge access (NO in step S12), the management node or management node driver supplies the bus with the channel numbers, which are assigned to both the sender and receiver nodes, as addresses for the stream access, thereby to start transferring stream data from the sender node to the receiver node using the stream access (step S16). Since, in this case, double-edge enable bit information (DE En) at both the sender and receiver nodes is in a default state ("0"), the stream access is carried out by the single-edge access.

If the double-edge capable bit information (DE Ca) at the sender node is "1" or the sender node is a device which is adapted to the double-edge access (YES in step S12), then the management node or management node driver checks the double-edge capable bit information (DE Ca) at the receiver node and determines whether the receiver node is a device capable of double-edge access (steps S13 and S14).

If the double-edge capable bit information (DE Ca) at the receiver node is "0" or the receiver node is a device which is not adapted to the double-edge access (NO in step S12), the management node or management node driver supplies the bus with the channel numbers, which are assigned to both the sender and receiver nodes, as addresses for the stream access, thereby to start transferring stream data from the sender node to the receiver node using the stream access (step S16).

Since, in this case, the double-edge enable bit information (DE En) at both the sender and receiver nodes is in a default state ("0"), the stream access is carried out by the single-edge access.

If the double-edge capable bit information (DE Ca) at the receiver node is "1" or the receiver node is a device which is adapted to the double-edge access (YES in step S14), the management node or management node driver sets double-edge enable bit information (DE En) at each of the sender and receiver nodes to "1" (step S15) and then supplies the bus with the channel numbers, which are assigned to both the sender and receiver nodes, as addresses for the stream access, thereby to start transferring stream data from the sender node to the receiver node using the stream access (step S16). Since, in this case, the double-edge enable bit information (DE En) at both the sender and receiver nodes is "1", the stream access is carried out by the double-edge access at high speed.

Single-Edge/Double-Edge Selecting Operation #2

Figure 13:
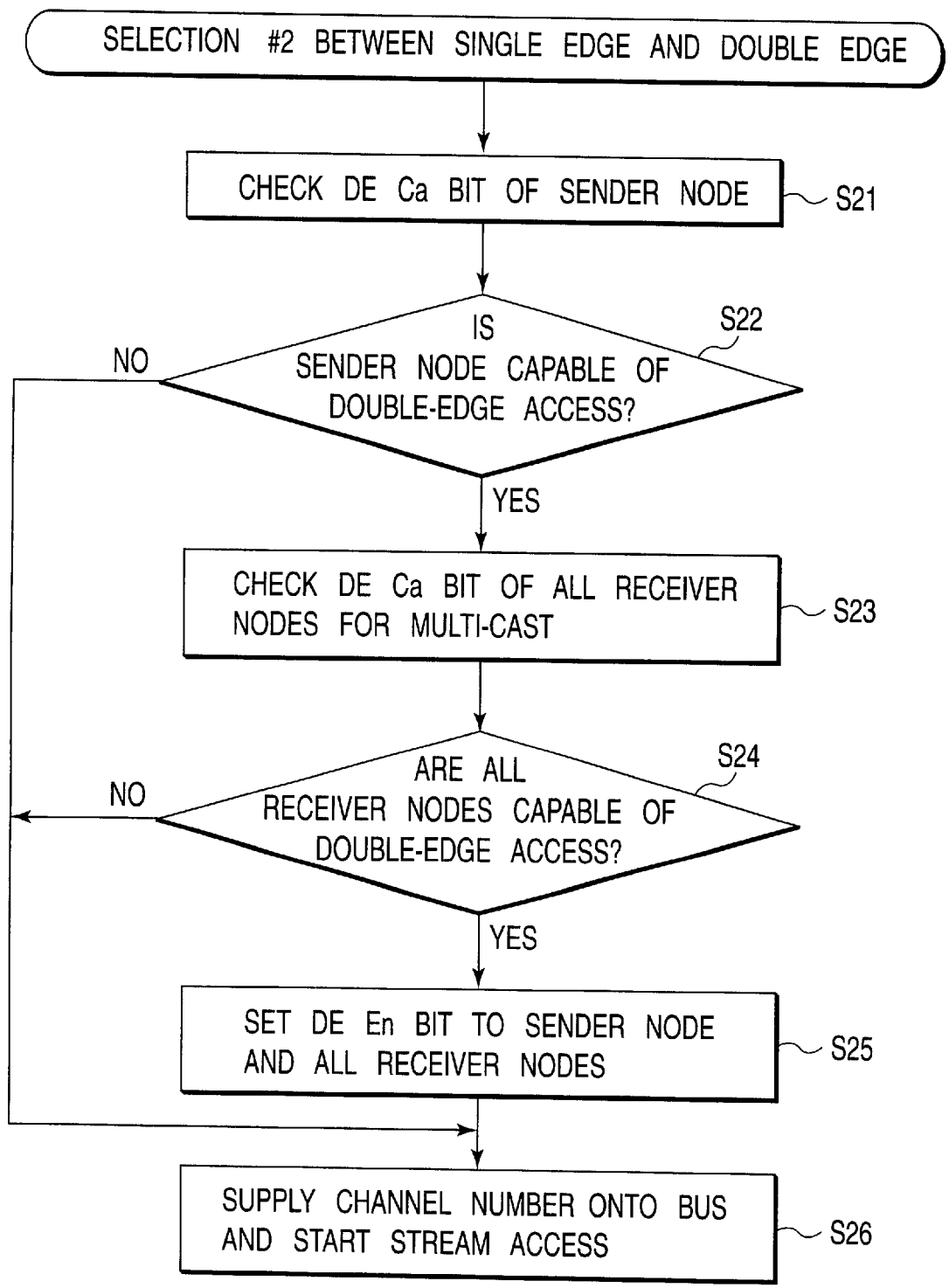
FIG. 13 is a flowchart for explaining another example of the procedure of the single-edge/double-edge select operation used in the embodiment.

Another process of performing a single-edge/double-edge selecting operation by the multimedia bus manager 15 as a management node or the software driver (management node driver) for controlling the multimedia bus manager 15, will now be described with reference to the flowchart of FIG. 13. It is assumed that the process is applied to the multi-cast in which the same stream data is transferred from a single sender node to a plurality of receiver nodes. At the time of the multi-cast, the following process is performed in order to transfer data in accordance with the lowest-performance one of the plurality of receiver nodes.

To execute the stream access by the multi-cast, first, the management node or management node driver checks double-edge capable bit information (DE Ca) at the sender node and then determines whether the sender node is a device capable of double-edge access (steps S21 and S22).

If the double-edge capable bit information (DE Ca) at the sender node is "0" or the sender node is a device which is not adapted to the double-edge access (NO in step S22), the management node or management node driver supplies the bus with the channel numbers, which are assigned to the sender node and the plural receiver nodes, as addresses for the stream access, thereby to start transferring stream data from the sender node to each of the receiver nodes using the stream access (step S26). Since, in this case, double-edge enable bit information (DE En) at the sender node and receiver nodes is in a default state ("0"), the multi-cast stream access is carried out by the single-edge access.

If the double-edge capable bit information (DE Ca) at the sender node is "1" or the sender node is a device which is adapted to the double-edge access (YES in step S22), then the management node or management node driver checks the double-edge capable bit information (DE Ca) at all the receiver nodes for the multi-cast, and determines whether they are devices capable of double-edge access (steps S23 and S24).

If the double-edge capable bit information (DE Ca) is "0" or there is at least one receiver node which is not adapted to the double-edge access (NO in step S24), the management node or management node driver supplies the bus with the channel numbers, which are assigned to the sender node and plural receiver nodes, as addresses for the stream access, thereby to start transferring stream data from the sender node to the receiver nodes using the stream access (step S26). Since, in this case, the double-edge enable bit information (DE En) at the sender node and each of the receiver nodes is in a default state ("0"), the multi-cast stream access is carried out by the single-edge access.

If the double-edge capable bit information (DE Ca) at each of the receiver nodes is "1" or all the receiver nodes are devices which are adapted to the double-edge access (YES in step S24), the management node or management node driver sets double-edge enable bit information (DE En) at each of the sender node and all the receiver nodes to "1" (step S25) and then supplies the bus with the channel numbers, which are assigned to the sender node and each of the receiver nodes, as addresses for the stream access, thereby to start transferring stream data from the sender node to each of the receiver nodes using the stream access (step S26). Since, in this case, the double-edge enable bit information (DE En) at the sender node and each of the receiver nodes is "1", the multi-cast stream access is carried out by the double-edge access at high speed.

In the system of the above-described embodiment of the present invention, both the single-edge access and double-edge access can be used selectively by the single multimedia bus 200 and thus the band of the stream access can be expanded when the need arises. Since, in particular, one of the single-edge access and double-edge access can be selected for each data transfer between nodes, stream data transfers using both the single-edge access and double-edge access can be performed at the same time. The performance of each node can thus be delivered sufficiently. Since, moreover, a circuit for the double-edge transfer has only to be incorporated into a node only for processing necessary stream data of a wide band, an internal circuit can be simplified in a node for processing relatively-low band data, thus decreasing in costs.

Various methods other than the above can be proposed as to which of the single-edge access and double-edge access is used. For example, the following two methods can be employed:

1) the method of switching one or more stream accesses from the single-edge access to the double-edge access when a plurality of streams have to be transferred at once by a plurality of stream accesses which are usually executed by the single-edge access; and 2) the method of choozing one of the single-edge access and double-edge access in accordance with the type of a stream for data transfer and the bandwidth required for stream transfer.

The multimedia bus 200 and the data transfer control method using the bus can be used as a platform of various types of digital information device, such as set-top boxes, digital TVs and game machines as well as computers.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A data processing apparatus comprising:

a bus for which a band-guaranteed cycle capable of transferring stream data in real time by assigning a predetermined reserved band for each cycle time, is defined;

a plurality of nodes connected to the bus and capable of sending/receiving the stream data using the band-guaranteed cycle;

means having a first bus access mode for transferring data in synchronization with one of rising and falling edges of a clock and a second bus access mode for transferring data in synchronization with each of the rising and falling edges of the clock, for setting a sender node for sending the stream data and a receiver node for receiving the stream data from the sender node, into one of the first and second bus access modes to perform a transfer of stream data using the band-guaranteed cycle; and means for supplying channel numbers assigned to the sender node and the receiver node to said bus to start the transfer of the stream data from the sender node to the receiver node.

2. The data processing apparatus according to claim 1, wherein an asynchronous transfer cycle for asynchronously performing a transfer cycle during a period other than the reserved band by bus access request of a bus master is defined for said bus as a transfer mode in addition to the band-guaranteed cycle, and the apparatus further comprises means for assigning a bus-using permission for the asynchronous transfer cycle to a sender node, which is sending stream data using the band-guaranteed cycle, by bus access request of the sender node, whereby the stream data is transferred from the sender node to the receiver node during the period other than reserved band.

3. The data processing apparatus according to claim 2, wherein the transfer of stream data from the sender node to the receiver node during the period other than the reserved band, is executed in a bus access mode which is equal to one of the first and second bus access modes used in the reserved band.

4. A data processing apparatus comprising:

a bus for which a band-guaranteed cycle capable of transferring stream data in real time by assigning a predetermined reserved band for each cycle time and an asynchronous transfer cycle for asynchronously performing a transfer cycle during a period other than the reserved band by a bus access request of a bus master are each defined as a data transfer cycle;

a plurality of nodes connected to the bus and capable of performing the data transfer cycle using one of the band-guaranteed cycle and the asynchronous transfer cycle;

means for assigning one of a plurality of channel numbers to a sender node and a receiver node of each stream data such that the stream data is transferred, using the band-guaranteed cycle in a peer-to-peer mode, between nodes to which a same channel number is assigned; and mode selection means having a first bus access mode for transferring the stream data in synchronization with one of rising and falling edges of a clock and a second bus access mode for transferring the stream data in synchronization with each of the rising and falling edges of the clock, for selecting one of the first and second bus access modes for each channel number to transfer the stream data using the band-guaranteed cycle.

5. A data transfer control method for transferring data between nodes through a bus selectively using a first bus access mode for transferring data in synchronization with one of rising and falling edges of a clock and a second bus access mode for transferring data in synchronization with each of the rising and falling edges of the clock, a band-guaranteed cycle capable of transferring stream data in real time by assigning a predetermined reserved band for each cycle time being defined for the bus, the method comprising the steps of:

assigning one of a plurality of channel number to a sender node and a receiver node of each stream data such that the stream data is transferred, using the band-guaranteed cycle in a peer-to-peer mode, between nodes to which a same channel number is assigned; and selecting one of the first and second bus access modes to be used in the band-guaranteed cycle for each channel number.

* * * * *